Sept. 14, 1965  G. F. M. CHAMPEL  3,206,118
DEVICE FOR REGULATING THE HUMIDITY OF A GASEOUS MASS
Filed Feb. 25, 1963
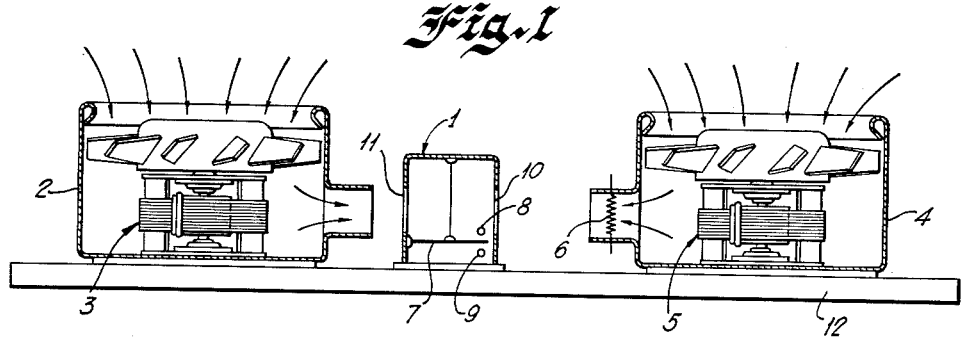
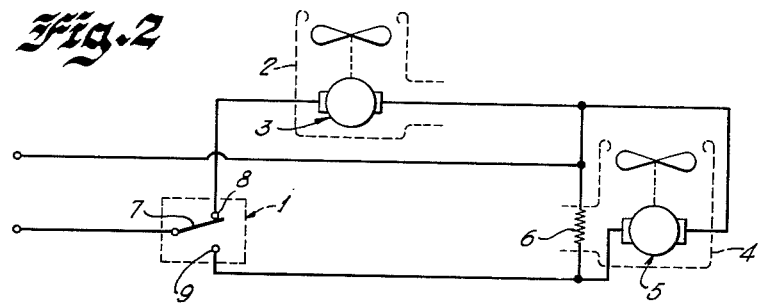
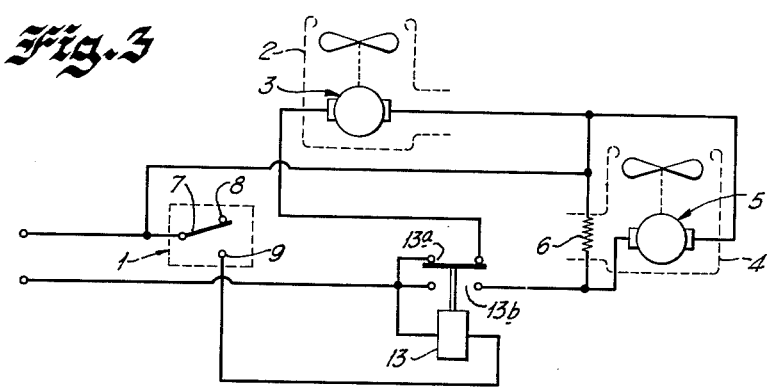
INVENTOR
GERARD FRANCOIS MARIUS CHAMPEL
by
Mason, Kolehmainen, Rathburn and Wyss
ATTORNEYS 3,206,118
DEVICE FOR REGULATING THE HUMIDITY OF A GASEOUS MASS
Gérard François Marius Champel, 30 Rue de Sarda, Montelimar, France
Filed Feb. 25, 1963, Ser. No. 260,386
Claims priority, application France, May 24, 1962, 626, Patent 1,342,768
5 Claims. (Cl. 236—44)

One of the objects of the invention is to obtain a more precise regulation of the humidity of the gaseous mass, more particularly the mass of air in a room.

Another object of the invention is to increase the sensitiveness of the reactions of a humidistat so as to obtain a more accurate regulating action by the humidistat.

Another object of the invention is to provide a process wherin the relative humidity of a portion of a gaseous mass which is to be humidity controlled is artifically modified to cause the humidistat to react upon the very slight variations of the humidity of the gaseous mass.

Other objects and advantages of the invention will be revealed by the description and claims hereafter as well as the drawings included herewith in which:

FIG. 1 is a diagrammatical sectional view of a device for regulating the humidity of a gaseous mass constructed in accordance with the present invention;

FIG. 2 is a schematic electric diagram for the device shown in FIG. 1;

FIG. 3 is a schematic electric diagram illustrating another embodiment of electrical circuitry for use with the device of FIG. 1.

The invention comprises means for reducing the range of variation of relative humidity in a gaseous atmosphere which is necessary to cause a humidistat to react and thereby increases the sensitivity and frequency of the reactions of the humidistat to changes in humidity and hence enables a more precise regulation of the humidity of the gaseous mass to be controlled.

A humidistat is a device sensitive to relative humidity which is utilized to control and maintain the relative humidity of a gaseous atmosphere, such as the air of a hall, at a given value.

Relative humidity is a ratio of the actual weight of water vapor contained in a given quantity of gas to the maximum weight of water vapor that the given quantity of gas could contain at the same temperature.

The present invention operates in accordance with the principle that when a given amount of water vapor is present in a fixed quantity of gas, as the temperature of the gas is increased the relative humidity will decrease correspondingly, hence, a decrease in the relative humidity of a quantity of gas can be obtained by artificially heating the gas to an elevated temperature. By directing a flow of the artificially heated gas having a reduced relative humidity over the sensitive element of a humidistat, the humidistat which is set to react at a given lower level of humidity will react much quicker because of the artificial variation of the humidity. In this manner it is possible to obtain increased sensitivity for a humidistat having a given reaction range between preselected upper and lower levels by artificially reducing the relative humidity of the gaseous mass to be controlled and passing this gas over the sensitive element of the humidistat.

Referring now to FIG. 1, there is illustrated a device constructed in accordance with the present invention including a humidistat 1, having an uppper contact 8 in a lower contact 9 therein. The humidistat includes a movable contact or stud 7 which moves upwardly or downwardly to contact the contacts 8 and 9 in response to variations in relative humidity. When the relative humidity of the atmosphere surrounding the sensitive element 7 reaches a predetermined lower level (for example 60 percent) the element 7 will move upwardly to contact the upper contact 8 when the humidity increases to an upper level (for example 66 percent) the element 7 will move downwardly to make contact with the lower contact 9. The humidistat includes a box like casing having openings 10 and 11 in opposite side walls thereof in order that an air mass which is to be humidity controlled can flow over the sensitive element 7 to cause the element to react.

On opposite sides of the humidistat 1 there are provided motor driven fan units 3 and 5. The motor driven fan unit 3 includes a fan housing 2 which has a discharge opening disposed to face and direct a flow of air through the opening 11 over the sensitive stud or contact 7 and the contacts 8 and 9 of the humidistat. The motor driven fan unit 5 includes a similar fan housing 4 having an outlet disposed to face and direct a flow of air through the opening 10 of the humidstat over the sensitive element 7 and the contacts 8 and 9. The humidistat 1 and the motor driven fan units 3 and 5 are positioned as shown in FIG. 1 upon a common base 12 with the discharge opening of the unit 3 disposed nearer to the sensitive element 7 of the humidistat than the discharge opening of the fan unit 5. Within the fan housing 4 there is provided a heating element 6 which supplies heat to the air mass passing through the fan housing for artificially lowering the relative humidity thereof. This preheated air is directed through the opening 10 in the humidistat by the fan unit 5.

If, for example, the humidistat 1 is constructed so that the sensitive element 7 moves upwardly to engage the upper contact 8 when the humidity falls to 60 percent and the sensitive element 7 moves downwardly to contact the lower contact 9 when the humidity reaches 66 percent, the humidistat is said to have an operating range of 6 percent between its actuating points.

Referring to FIG. 2, when the apparatus of the present invention is put into operation and the relative humidity is less than 60 percent the stud 7 will be in contact with the contact 8 and the motor driven fan unit 3 will be energized to direct a flow of air through the humidistat 1. When the contacts 7 and 8 are closed, a humidifying device, not shown, is energized for increasing the humidity of the air mass. As the humidity of the air mass increases, the sensitive element 7 will move away from the contact 8 toward the contact 9. When the relative humidity of the air passing from the motor driven fan unit 3 through the humidistat reaches 66 percent, the sensitive element 7 is in contact with the contact 9 which contact is utilized to shut off the supply of water to the humidifying apparatus. When this occurs, the motor driven fan unit 5 and heating element 6 therein is energized to direct a flow of artificially heated air over the sensitive element of the humidistat. Since the preheating of the air within the fan housing 4 artificially reduces the relative humidity of this air flow, the sensing unit 7 of the humidistat will be subjected to a lower relative humidity and will begin to move upwardly away from the contact 9. When the humidity of the preheated air flow reaches the lower level of 60 percent, the sensitive element 7 will again contact the upper contact 8 which shuts off the motor driven fan unit 5 and starts the motor driven fan unit 3 and the humidifying apparatus of the room. By artificially preheating the air passing through the motor driven fan unit 5 by means of the heating element 6, the relative humidity of the air surrounding the sensitive element 7 of the humidistat is rapidly reduced to the lower reaction level of 60 percent even though the humidity within the room itself has only been reduced by a small amount. And thus, the device of the present invention greatly increases the sensitivity and reaction time for controlling and maintaining the relative humidity at a relatively constant level.

The air taken from the hall which is to be humidity controlled is directed through the fan 5 and heats up as it passes over the heating element 6. The preheated air then flows through the opening 10 into the humidistat 1, and flows over the sensitive element 7. As an example, if the intensity of the heat given off by the heating element 6 and the ventilation obtained from the fan unit 5 are such that the humidistat 1 is subjected to a temperature exceeding that of the hall by approximately 1.25 degrees centigrade, the element 7 is subjected to a relative humidity which is less than that of the hall by about 5 percent (approximately 61 percent).

When the relative humidity in the hall drops from 66 percent to 65 percent (or 1 percent) the humidity of the preheated air (which has already been artificially lowered to 61 percent) drops to approximately 60 percent, which is the lower reaction level of the humidistat, and the element or stud 7 closes with the contact 8 to start, the humidifying apparatus. Thus, the effective operating range of the humidistat 1 has been reduced from 6 percent to 1 percent and, consequently, more precise humidity control is provided with greater reduced fluctuations in humidity.

It should be noted, however, that the heating element 6 can be made adjustable to provide the desired heating or can be shut off by a switch (not shown) if desired and the speeds of the fan units 3 and 5 can be adjustable. Also, during the working cycles of the motor fan unit 5, the motor fan unit 3 can be either shut off or run. These features provide for precise regulation of the rise in temperature of the preheated air from the fan unit 5 which reaches the sensitive element 7 of the humidistat 1, and hence precise control of sensitivity of the unit is obtained.

Likewise, the motor fan unit 5 can run in both directions, thus replacing the motor fan unit 3 at the moment when rotation is reversed, the air being circulated in a preheated or non-heated condition through the openings 10 and 11 of the humidistat 1 in a manner previously described.

In the example shown in the embodiment of FIG. 3, only the contact 9 is utilized for starting up the motor fan units 3 and 5. The contacts 7 and 9 are connected in series in the operating circuit of a relay 13 having two contacts 13a and 13b, which contacts are respectively connected to the motor fan units 3 and 5 in such manner that one or other of these fan units is fed during the supply or non-supply of electrical energy to the relay 13. The closing of the contact 9 and element 7 occurs when the relative humidity reaches a lower limit (60 percent, for example) and the circuit is then completed so that current is supplied to the motor fan unit 5. A similar regulating effect can be accomplished by utilizing the contact 8 and the element 7 placed in series for feeding the relay 13 to reverse the contact makers connecting the motor fan units 3 and 5 to the contacts 13a and 13b.

The industrial utility of this device is undisputable, more particularly in the case where materials must be worked upon in conditions of very constant relative humidity.

By way of example, we may quote textile materials whose working is so much the more difficult or defective when variations of relative humidity are greater.

Obviously, the invention is not restricted to the examples of embodiment above for which other methods and forms of embodiment can be provided without going outside of the scope of the invention for that purpose.

I claim:
1. Apparatus for controlling the relative humidity of a gaseous mass comprising a humidistat having a humidity sensitive operating element movable to a first actuating position when the relative humidity reaches a preselected lower level and movable to a second actuating position when the relative humidity reaches a preselected upper level, first fan means for directing a flow of said gaseous mass over said sensitive element, second fan means including a heating element for directing a flow of said gaseous mass preheated by said heating element over said operating element and means operably interconnecting said humidistat and said second fan means to operate the latter when said operating element is in said second actuating position.

2. Apparatus for controlling the relative humidity of a gaseous mass comprising a humidistat including a humidity sensing element movable to close a first pair of contacts when the relative humidity reaches a predetermined lower limit and to close a second pair of contacts when the relative humidity reaches a predetermined upper limit, first fan means for directing a flow of said gaseous mass over the sensing element of said humidistat, second fan means including a heating element for directing a flow of said gaseous mass heated by said heating element over said sensing element and means interconnecting said second fan means to said second pair of contacts to operate said second fan means when said second pair of contacts are closed in response to high relative humidity.

3. Apparatus as defined in claim 2 wherein said first fan means is operable to direct a flow of gaseous mass over said sensitive element only when said sensitive element is in said first actuating position.

4. Apparatus as defined in claim 3 wherein said second fan means is operable to direct a flow of heated gaseous mass over said sensitive element only when said sensitive element is in said second actuating position.

5. Apparatus as defined in claim 2 wherein said humidistat includes a casing enclosing said sensitive element, said casing having a pair of inlet openings on opposite side walls thereof, said first fan means positioned to direct its flow through one of said openings and said second fan means positioned to direct its flow through the other of said openings.

References Cited by the Examiner

UNITED STATES PATENTS

| 1,727,099 | 9/29 | Cochrane | 236—44 |
| 1,760,082 | 5/30 | Parks | 236—68 X |
| 1,770,765 | 7/30 | Bulkeley | 236—44 |
| 1,818,546 | 8/31 | Evans. | |
| 1,983,077 | 12/34 | Getchell. | |
| 2,192,748 | 3/40 | Knight. | |

EDWARD J. MICHAEL, *Primary Examiner.*

ALDEN D. STEWART, *Examiner.*